United States Patent [19]
Lundsager et al.

[11] 3,985,846
[45] Oct. 12, 1976

[54] CERAMIC FIRING PROCESS
[75] Inventors: Christian Bent Lundsager; Robert Matthews Murch, both of Ashton, Md.
[73] Assignee: W. R. Grace & Co., New York, N.Y.
[22] Filed: Apr. 16, 1975
[21] Appl. No.: 568,634

[52] U.S. Cl................................. 264/44; 252/421
[51] Int. Cl.²........................................ B01J 37/00
[58] Field of Search........... 252/455 R, 421; 264/43, 264/44, 60, 62

[56] References Cited
UNITED STATES PATENTS
3,261,894 7/1966 Seidl..................................... 264/62
3,755,204 8/1973 Sergeys........................... 252/455 R Primary Examiner—Donald J. Arnold
Assistant Examiner—John Parrish
Attorney, Agent, or Firm—Kenneth E. Prince; Joseph P. Nigon; Arthur P. Savage

[57] ABSTRACT

This invention relates to an improvement in the process of preparing porous ceramic articles which are formed by blending a composition containing a polyolefin, a ceramic filler and a plasticizer; shaping the blend; extracting the plasticizer and firing the article to remove the polyolefin. The improvement comprises soaking the extracted article in a water solution of a surfactant prior to firing which results in a substantial reduction in the number of cracked pieces when firing many pieces simultaneously.

2 Claims, No Drawings

CERAMIC FIRING PROCESS

BACKGROUND OF THE INVENTION

Prior Art Discussion

The use of organic binders for ceramic powders is a well established commercial practice. U.S. Pat. No. Re. 28,195 reissued Oct. 8, 1974, on U.S. Pat. No. 3,755,204 to Frank J. Sergeys and commonly assigned with the present application discloses a method of preparing porous-ceramic exhaust oxidation catalysts from ceramic powder filled, plasticized polyolefins. The disclosed method involves homogeneously blending a composition containing a polyolefin, a ceramic filler and a plasticizer; shaping the composition into an appropriate form; extracting the plasticizer with a solvent, and firing the extracted form to remove the polyolefin.

In actual practice it has been found that when fired under normal ceramic firing conditions the above-mentioned structures invariably develop cracks. To date the solution to this problem has been to fire the structures under carefully controlled reducing conditions up to the temperature where the organic binder has been removed, presumably by evaporation. This method is wasteful of fuel, because excess gas is used to secure the reducing kiln atmosphere. It is also difficult because continuous monitoring of the kiln atmosphere is required to insure net reducing conditions.

Objects of the Invention

It is therefore an object of this invention to provide a method of firing porous ceramic monolithic structures which will not result in cracking of portions of said structures.

It is a further object of this invention to provide a method of firing porous ceramic monoliths without the occurrence of cracking of portions thereof which will not require a carefully controlled reducing kiln atmosphere.

BRIEF DESCRIPTION OF THE INVENTION

This invention is primarily aimed at eliminating the occurrence of cracking of portions of ceramic porous monoliths used in catalytic automotive emission control, when the said structures are fired for the purpose of removing by evaporation the polyolefin binder. This objective, it has been discovered, can be attained by immersing the porous ceramic monolith in an aqueous solution of a surfactant prior to firing of said structure.

As a corollary to the above stated invention it has also been observed that when said procedure of soaking ceramic monolith in surfactant solution prior to firing is followed it no longer becomes necessary to conduct said firing at carefully controlled reducing atmosphere, and that normal stoichiometric flame conditions can be used.

DETAILED DESCRIPTION OF THE INVENTION

This invention focuses on a novel procedure which allows porous ceramic monoliths used in automotive emission control systems to be produced with a higher yield by reducing the number of pieces with cracks.

The first step in the process of the present invention involves preparing a monolith comprising a polyolefin, a ceramic powder, and a plasticizer. Each of these components is essential for the attainment of desirable performance characteristics in the end product.

As shown in F. J. Sergeys, U.S. Pat. No. Re. 28,195, the preparation of said porous ceramic monolith comprises the following steps:

a. A polyolefin is blended with a ceramic filler and plasticizer.

b. The composite is heated to thermoplastically compound the mixture and shaped into a structure containing a plurality of channels.

c. The plasticizer is extracted with the appropriate solvent.

d. At this point the porous ceramic structure is ready to be fired to accomplish the polyolefin removal and ceramic sintering. According to the present invention it has been discovered that the firing process can be carried out either at controlled reducing atmosphere conditions or preferably, in view of reduced fuel consumption, at normal stoichiometric flame conditions followed by subsequent sintering, in either case without the occurrence of cracking in any portion of said structures provided said structures have been immersed prior to firing into a ½% aqueous solution of a surfactant. The surfactant is added to cause wetting of the solvent extracted structure consisting of the ceramic powder, polyethylene and a minor residue of the oil. The structure will not adsorb much water unless the water contains a surfactant. The type of surfactant used is not critical. Most of the common detergents of the household and industrial types will give satisfactory results. In addition the non-ionic surfactants such as the polyethoxy esters of the oil acids and the anionic surfactants such as for example alkylbenzene sulfonates, petroleum sulfonates, sulfated natural fats and oils may be used.

It is believed that the mechanism which permits firing at normal stoichiometric flame conditions is the following: During the initial temperature rise the water evaporates and replaces the air in the pores and channels of the monolith and shortly also in the kiln space. It is also believed that water vapor remains present in the structure even after degradation of the binder has started so that eventually vapors from degradation of said binder take over and maintain the reducing atmosphere which otherwise would have to be maintained at costly and wasteful fuel consumption.

The following examples will aid in further explaining the invention.

EXAMPLE 1

A ceramic powder filled polyethylene composition containing the following components in weight percent: 7% particle form linear polyethylene of 0 Melt Index (SLMI), 71% cordierite or mixture of ceramic powders which upon firing results in a cordierite ceramic, and 22% of a mineral oil with approximately 80 percent saturates (viscosity:ss at 100° F.=547, refractive index=1.4932 ± 0.0003, and specific gravity at 15° C.=0.9036–0.9071) available commercially as Shellflex 411 was prepared by compounding the raw materials in a Banburry internal mixer at 170° C. This composition was then extruded into a sheet of about 0.025 inch thickness, which while still hot, was embossed to a ribbed sheet with 0.012 inch backweb thickness and ribs 0.057 inch high and 0.012 inch wide. The ribs were spaced 1/16 inch apart and non perpendicular to the extrusion direction. This sheet was then wound on a mandrel and heatsealed to itself during winding. Individual monolith pieces were cut from the heatsealed roll, and the plasticizer was extracted with a suitable solvent (perchloroethylene), dried and heated in a furnace in an oxidizing atmosphere first to about 250° C. (over a period of about 2 hours) when degradation began as evidenced by the black color of the structure. The temperature was slowly increased and about 2 hours later and at about 700° C. the structure turned a lighter color, indicating that the burn off of the polyethylene was complete. The temperature was then slowly increased and about 2 hours later the temperature reached 1400° C where it was held for about 2 hours to sinter the remaining ceramic powder and cooled slowly (about 4 hours).

Under these conditions, the monolith would invariably crack during firing unless they were of a small (less than 2–3 inch diameter) size.

EXAMPLE 2

A honeycomb-like cylindric structure according to the embodiments of this invention was prepared following same procedure as outlined in Example 1 up to and including the step of plasticizer extraction.

At this point said structure was soaked over a period of 8 to 16 hours in a ½% solution of a liquid phosphate free detergent sold under the trade name Liqui-Nox by Alconox Inc. of New York, New York.

The structure after soaking was shaken to remove excess water after which the net weight gain due to residual water was 10%.

The structure was fired at conventional reducing atmosphere and at a temperature of 240° C. to 270° C. for about 2 hours to form a porous ceramic structure and to burn off the polymer and subsequently was sintered at 1400° C. for 2 hours.

The ceramic structure prepared as described in the above procedure showed no cracks.

EXAMPLE 3

A ceramic monolith according to the embodiments of this invention was prepared following the same procedure as outlined in Example 2 with the exception that said firing was conducted under normal stoichiometric flame conditions i.e. the costly controlled reducing atmosphere conditions were eliminated.

The ceramic structure prepared as described supra showed no cracks in addition to involve substantial fuel savings.

EXAMPLE 4

A total of 76 monoliths were prepared according to this invention, including soaking overnight in water with 0.5% "Liqui-Nox." They were fired in a gasfired kiln at a reseach facility operated by a furnace manufacturer. The yield of ceramically sound pieces without cracks or delaminations was 79% which is substantially higher than the average 50% yield obtained in other firings of similar monoliths at the same facility using reducing conditions.

The kiln was fired with 20% excess air and the flue gas contained 4% oxygen. Previous experience with similar kiln atmosphere bed resulted in all pieces exhibiting cracks.

EXAMPLE 5

A total of 74 monoliths were prepared according to this invention, including soaking overnight in a ½% solution of Liqui-Nox in water. They were fired in the same kiln, but under reducing conditions. The yield was 62 pieces without cracks at 84%, again substantially better than the 50% expected without the water soaking.

What is claimed is:

1. In a process for preparing porous ceramic structures with good resistance to cracking during firing wherein a composition consisting essentially of a polyolefin, a ceramic filler and a plasticizer is homogeneously blended, said composition is shaped to form a plastic structure, whereupon said plasticizer is extracted with an appropriate solvent and said polyolefin is subsequently removed by heating to form a porous ceramic structure, the improvement which consists of soaking said extracted ceramic structure in an aqueous solution of ½% synthetic surfactant for 8 to 16 hours prior to said heating.

2. The process of claim 1 further characterized in that said firing of the ceramic structures takes place in a kiln operated at reducing atmosphere conditions.

* * * * *